May 5, 1936.   C. W. CRUMRINE   2,039,709
ADJUSTABLE LENS MOUNT
Filed March 13, 1935   2 Sheets-Sheet 1
FIG_1_
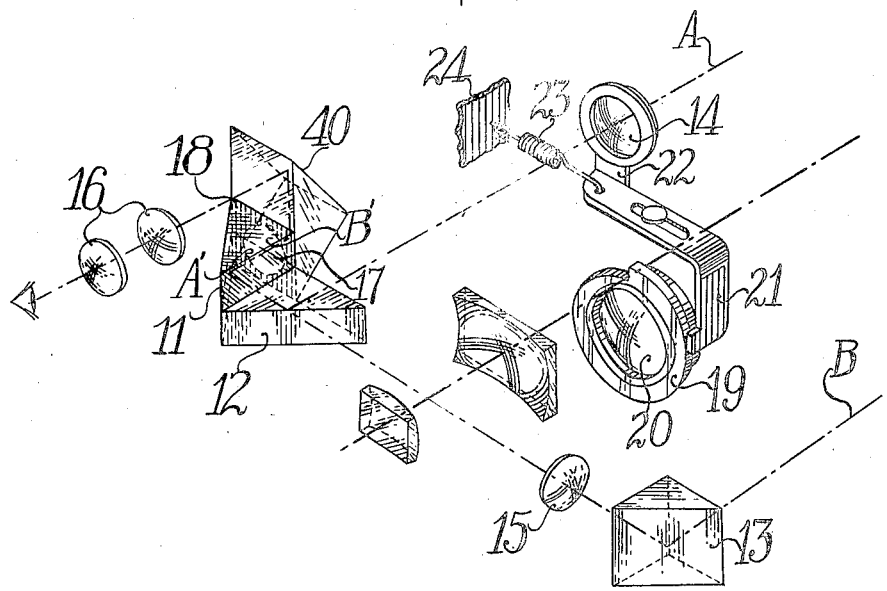
FIG_2_
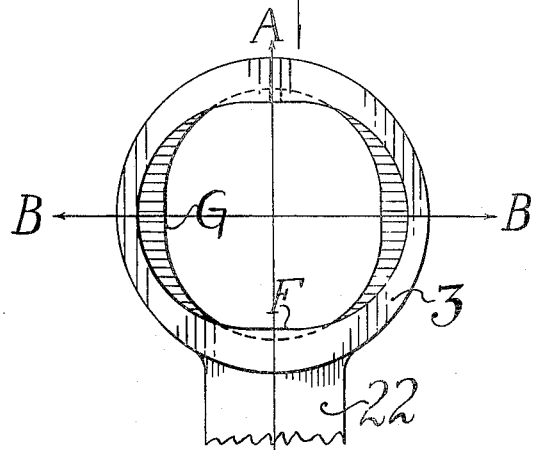
Inventor:
Chester W. Crumrine,
By Melvin M. Perrine
George A. Gillette Jr.
Attorneys

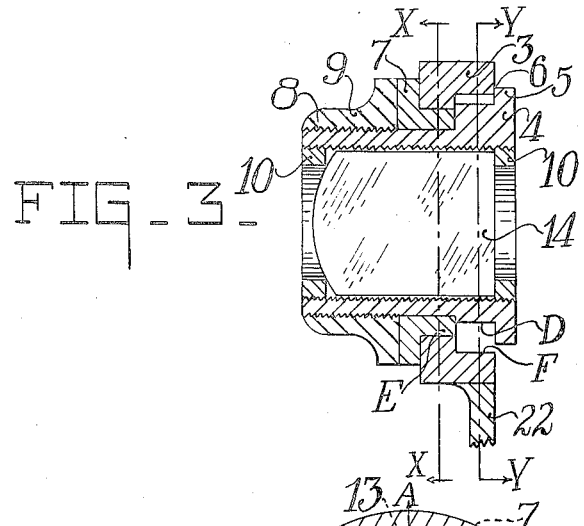
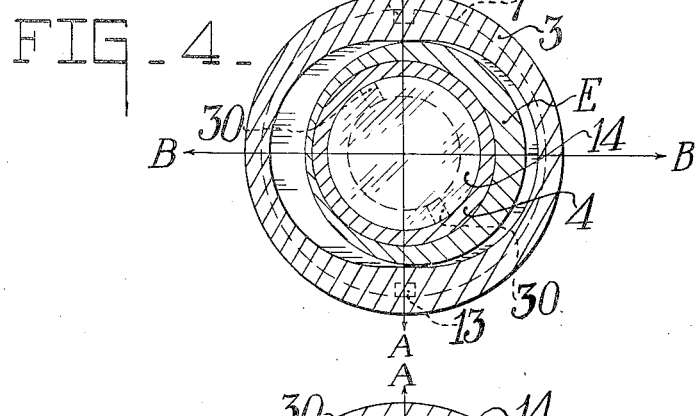
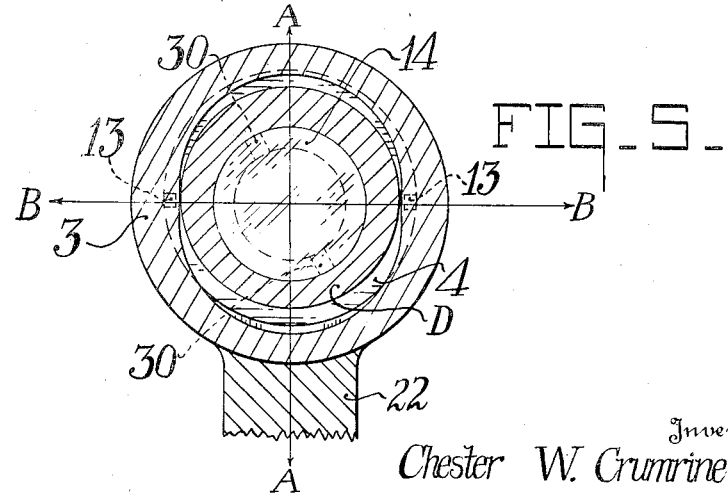

Patented May 5, 1936

2,039,709

UNITED STATES PATENT OFFICE 2,039,709

ADJUSTABLE LENS MOUNT

Chester W. Crumrine, Rochester, N. Y., assignor to Eastman Kodak Company, Rochester, N. Y., a corporation of New York Application March 13, 1935, Serial No. 10,852

10 Claims. (Cl. 88—57)

This invention relates to photography and more particularly to an adjustable lens mounting.

The object of this invention is to provide a lens mounting by means of which the lens is capable of being adjusted along any of three axes, relative to the optical axis of the lens, namely, horizontal, vertical, and longitudinal, each one of these adjustments being independent of the other two.

I have shown my adjustable lens mounting as applied to a range finder system for a camera which is disclosed in a co-pending patent application entitled "Range finder for cameras" bearing the Serial Number 742,242 and of which Joseph Mihalyi is the inventor. Although I have shown this adjustable lens mounting applied to a range finder on a camera for the purpose of illustration, it is to be understood that it is not limited to this use, but can be used in any set up where a lens mounting is required.

Regardless of the care that may be exercised in the manufacture of the many parts which go to make up a photographic apparatus, there are bound to be some small discrepancies which become most pronounced when the apparatus is completely assembled. To those skilled in the art it is well known that the precision with which lenses have to be mounted in an optical system is very exacting, and a means for overcoming any minor discrepancies in the manufacture of the individual pieces, which would probably be multiplied when these several pieces were assembled, has to be provided for by some form of adjustment of the lens within the mounting or by an adjustment of the lens mounting itself with relation to the rest of the optical system. Therefore my invention is so designed that these discrepancies of manufacture can be overcome in the assembled apparatus by adjusting the lens within its mounting along either one or all of three axes relative to the axis of the lens, each adjustment being independent of the other two.

My invention consists of a lens mounting comprising a mounting plate slotted halfway through on opposite faces so that the guiding edges of one slot extend in a direction perpendicular to the guiding edges of the other slot and in a direction parallel to axes which are horizontal and vertical with respect to the optical axis of the lens. The slots in the mounting plate cooperate with eccentric portions on the lens barrel and a supplementary ring fitted to the lens barrel to shift the lens barrel and consequently the lens along either of the two above mentioned axes, each adjustment being independent of the other. The adjustable parts are held in any one position by a locking nut which is threaded to the outside of the lens barrel. An adjustment of the lens itself in a direction longitudinal of the optical axis of the lens is accomplished by means of two lens adjusting nuts which are threaded to the inside of the lens barrel in front of and behind the lens itself.

The novel feature that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which like reference characters refer to like parts throughout.

Fig. 1 is a diagrammatic view in perspective of the optical system of a range finder in connection with which I choose to show my adjustable lens mounting for the purpose of illustration.

Fig. 2 is an end elevation to enlarged scale of the slotted mounting plate.

Fig. 3 is a longitudinal sectional view to enlarged scale of the assembled lens mounting.

Fig. 4 is a vertical sectional view of the assembly taken on line $x$—$x$ of Fig. 3 and Fig. 5 is a vertical sectional view of the assembly taken on line $y$—$y$ of Fig. 3.

For the purpose of illustration I have shown my adjustable lens mounting in connection with the range finder optical system, shown in Fig. 1. The image forming part of the range finder comprises telescopes having two objectives 14 and 15 of the same focal length and a single ocular consisting of two lens elements 16 for viewing the adjacent images formed by the objectives as will now be described. The objective 14 positioned in the direct light beam A is of such focal length that the light passing therethrough, after being twice reflected by prism 12, forms an inverted half image A' of the field of view on the surface between the prism 12 and the prism 40. The objective 15 positioned in the base line of the range finder receives light from the beam B after being deflected by the prism 13 and forms an inverted half image B' at the contacting faces of the prisms 11 and 40.

The two half images A' and B' are adjacent and sharply separated by the line 17 formed between the two prisms 11 and 12. The size of these images may be defined by an opaque shield 18 which serves as a field stop for the telescope systems. The focal length of the ocular 16 is such as to take in the glass path of the prism 40 to the focal plane at which the images A' and B' appear.

The telescope objective lens 14 is preferably utilized for bringing the range finder images into coincidence by arranging it to be moved transversely of its optical axis in strict accordance with the distance for which the camera is focused. One suitable arrangement for imparting this movement to the objective lens is shown as comprising a radial cam 19 rotatable with the camera objective 20 in focusing and which, through a cam follower 21, imparts movement in one direction to the objective 14, and its mount 22 carried by the cam follower 21. A coiled spring 23 is provided having one end secured to the cam follower 21, and its other end anchored to a suitable part 24 of the camera casing for keeping the cam follower 21 in contact with the cam 19 and for moving the objective in the other transverse direction.

The telescope objectives 14 and 15 form inverted images A' and B' at the coincidence line 17, and these images, when erected and viewed through the ocular 16, will first appear out of coincidence, and adjustment of the camera objective 20 to bring these two images into coincidence by moving the telescope objective 14 will insure the camera being in focus for the object whose images are brought into coincidence.

From this last statement it will be understood that the telescope objective 14 and the camera objective 20 must be initially positioned in very definite relation to each other in order to effect the proper coordination of the two as described above. It is obvious that any small discrepancy in the manufacture of any of the parts which go to make up this optical system would affect its proper operation and for this reason an adjustment for the lens, as provided for by my device would be very advantageous.

My device consists of a mounting plate 3, as shown in Fig. 2, one face of which is slotted to half its thickness by a slot F having substantially straight guiding edges on the axis B—B, and slotted on the opposite face to one half of its thickness by a slot G whose guiding edges are along the axis A—A.

As shown these slots take the form of ellipses having substantially straight sides in a direction of their major axis, said straight portions acting as guiding surfaces for engaging cam surfaces as described below. The principal axis of these two elliptical slots are perpendicular to one another, but since the straight portion of their sides constitute the only guiding surfaces for the cooperating cams these slots could just as well be replaced by slots whose edges were straight throughout. The mount 22 may be attached to or be integral with the mounting plate to connect it with the cam follower plate 21 as shown in Fig. 1. The lens barrel 4 is provided with an eccentric portion D, as shown in Figs. 3 and 5, whose thickness equals the depth of the slot G, in one side of the mounting plate 3, so that the shoulder 5 on the lens barrel 4 has a bearing surface on the outside face of the mounting plate 3, as shown at 6, when this eccentric portion D of the lens barrel 4 is in engagement with the slot G. As the lens barrel 4 is revolved, the eccentric portion D contacts the guiding edges of the slot G and shifts the lens 14 along the axis B—B as shown in Fig. 5. The slot F in the mounting plate 3 is engaged by an eccentric portion E on the collar 7 which is rotatably mounted on the lens barrel 4 so that as the collar 7 is turned on the lens barrel 4 the eccentric portion E contacts the guiding edges of the slot F in the mounting plate 3 and causes the lens 14 to be moved along the axis A—A, relative to the optical axis of the lens 14. By referring to Figs. 4 and 5 it can be seen that the adjustment of the lens 14 along either the axis A—A or B—B is independent of the other, because as the lens barrel 4 is turned causing its eccentric portion D to act on the edge of the slot G and move the lens 14 along the axis B—B the guiding edges of the slot F in conjunction with the eccentric portions on the collar 7 allow the movement of the lens 14 along the axis B—B but prevents its movement along the axis A—A as long as the collar 7 is held stationary.

The lens barrel 4 is externally threaded at 8 and engaged by a threaded collar 9 which serves as a locking nut for definitely positioning the lens 14 in any desired position with relation to the axes A—A and B—B, the locking being effected by clamping the movable parts between the collar 9 and the shoulder 5 on the lens barrel 4. The lens 14 is positioned longitudinally in the lens barrel by means of locking nuts 10 which are threaded to the interior of the lens barrel 4 in front of and behind the lens, and by loosening one of these nuts 10 and tightening the other the lens 14 can be shifted along the optical axis of the lens to effect any desired correction that might be required along this axis. In order to permit the lens barrel 4 and the collar 7 to be turned, I have provided their peripheries with spaced notches 13 which can be engaged by suitable wrenches or even the end of a screw driver; but I might have shown these circumferences provided with flats which could be engaged by a wrench. . The locking nuts 10 which position the lens longitudinally within the lens barrel 4 are also shown provided with notches 30 which might be engaged by a suitable tool for effecting their positioning.

This adjustable lens mounting is designed primarily for use as a factory adjustment for correctly positioning a lens in an assembled optical system in order to overcome any discrepancies which have occurred during the manufacture of its several parts. In operation the first step is to loosen the threaded collar 9 to permit the turning of the lens barrel 4 and the collar 7. To move the lens 14 along the axis B—B the lens barrel 4 is turned in the right direction so that its eccentric portion D contacts the guiding edges of the slot G and shifts the lens 14 in the desired direction. During this adjustment the straight portions of the slot F which extend in a direction parallel to the axis B—B act as guides to allow the eccentric portion E on the collar 3 to slide in this direction, but at the same time prevent any translation of the lens barrel along the axis A—A. Now if a shift of the lens 14 is desired along the axis A—A, the collar 7 is turned so that its eccentric portion E contacts the guiding edges of the slot F and shifts the lens 14 along the axis A—A, as shown clearly in Fig. 4. During this shift, the engagement of the guiding edges of the slot G and the eccentric portion D of the lens barrel 4 permit the shift in this direction but prevents any shift along the axis B—B as shown in Fig. 5. After the lens is correctly positioned with respect to these two axes the threaded collar 9 is turned down to clamp the movable parts between itself and the shoulder 5 on the lens barrel 4 thereby locking the lens relative to the axes A—A and B—B. If a shift of the lens 14 is required along the longitudinal axis of the lens barrel the two locking nuts 10 are correspondingly loosened or tightened until the desired position is attained.

This adjustable lens mounting, although it may appear complicated has proven itself to be a very compact and simple device for correctly positioning a lens in an optical system after assembly of the optical system has turned up discrepancies in the several parts which have to be allowed for. This mounting provides a very convenient means of correctly positioning a lens in any assembled optical system as a final factory adjustment, and it is so compact that its outward appearance gives no indication of its use and thereby tempt the individual operator to tamper with it.

Although I have shown and described certain specific embodiments of my invention, I am fully aware that many modifications thereof are possible. My invention, therefore, is not to be restricted except in so far as is necessitated by the prior art and by the spirit of the appended claims.

I claim:

1. In an adjustable lens mount, the combination with a support member provided with two pairs of guiding surfaces formed by two slots in said support member, the two guiding surfaces of one slot being parallel to each other and perpendicular to the two parallel guiding surfaces of the other slot, and a lens carrying element including an eccentric cam surface for engaging one of said slots on said support member and forming with said guiding surfaces of that slot one pair of cam surfaces for causing relative radial movement between said members upon relative rotation therebetween, of an intermediate element having an eccentric cam surface for engaging the guiding surfaces of the other slot on said support member and forming with said guiding surfaces of said other slot another pair of cam surfaces for causing relative radial movement between said support member and said intermediate member upon relative rotation therebetween, said pairs of cam surfaces being so located and arranged that the radial movement caused by the relative rotation of one of said pairs of cam surfaces is limited to movement in a direction parallel to one of said slots by the other pair of cam surfaces.

2. In an adjustable lens mount, the combination with a support member, provided with two cam surfaces which have their principal axis perpendicular to each other, and a lens carrying member including an eccentric cam surface for engaging one of said cam surfaces on said support member and forming with that cam surface one pair of cam surfaces for causing relative radial movement between said members upon relative rotation therebetween, of an intermediate element having an eccentric cam surface for engaging the other eccentric cam surface on said support member and forming with said other eccentric cam surface another pair of cam surfaces for causing relative radial movement between said support member and said intermediate element upon relative rotation therebetween, said pairs of cam surfaces being so located and arranged that the radial movement caused by the relative rotation of said pairs of cam surfaces, is limited to movement along one said principal axis by the other pair of cam surfaces.

3. In an adjustable lens mount, the combination with a mounting plate provided with two pairs of guiding surfaces formed by slots in said plate, the two guiding surfaces of one slot being parallel to each other and perpendicular to the two parallel guiding surfaces of the other slot, and a lens carrying element including an eccentric cam surface for engaging one of said slots on said support member and forming with the guiding surfaces of said slot one pair of cam surfaces for causing relative radial movement between said members upon relative rotation therebetween, of an intermediate element having an eccentric cam surface for engaging said guiding surfaces of said other slot on said support member and forming with said guiding surfaces of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces.

4. In an adjustable lens mount, the combination with a mounting plate provided with two pairs of guiding surfaces formed by slots in said plate, the two guiding surfaces of one slot being parallel to each other and perpendicular to the two parallel guiding surfaces of the other slot, and a lens carrying element including an eccentric cam surface for engaging one of said slots on said support member and forming with the guiding surfaces of said slot one pair of cam surfaces for causing relative radial movement between said members upon relative rotation therebetween, of an intermediate element having an eccentric cam surface for engaging said guiding surfaces of said other slot on said support member and forming with said guiding surfaces of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces, and clamping means threaded to said lens carrying element for clamping the adjustable cam surfaces in any desired position.

5. In an adjustable lens mount, the combination with a mounting plate provided with two pairs of guiding surfaces formed by slots in said plate, the two guiding surfaces of one slot being parallel to each other and perpendicular to the two parallel guiding surfaces of the other slot, and a lens carrying element extending through said plate, including an eccentric cam surface for engaging one of said slots on said support member and forming with the guiding surfaces of said slot one pair of cam surfaces for causing relative radial movement between said members upon relative rotation therebetween, of an intermediate element having an eccentric cam surface for engaging said guiding surfaces of said other slot on said support member and forming with said guiding surfaces of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces.

6. In an adjustable lens mount, the combination with a mounting plate provided with two pairs of guiding surfaces formed by slots in said plate, the two guiding surfaces of one slot being parallel to each other and perpendicular to the two parallel guiding surfaces of the other slot, and a lens carrying element including an eccentric cam surface for engaging one of said slots on said support member and forming with the guiding surfaces of said slot one pair of cam surfaces for causing relative radial movement between said members upon relative rotation therebetween, of an intermediate element slidably mounted concentrically on the lens carrying element and having an eccentric cam surface for engaging said guiding surfaces of said other slot on said support member and forming with said guiding surfaces of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces.

7. In an adjustable lens mount, the combination with a mounting plate provided with two pairs of guiding surfaces formed by slots in said plate, the two guiding surfaces of one slot being parallel to each other and perpendicular to the two parallel guiding surfaces of the other slot and a lens carrying element extending through said plate, including an eccentric cam surface for engaging one of said slots on said support member and forming with the guiding surfaces of said slot one pair of cam surfaces for causing relative radial movement between said members upon relative rotation therebetween, of an intermediate element slidably mounted concentrically on the lens carrying element and having an eccentric cam surface for engaging said guiding surfaces of said other slot on said support member and forming with said guiding surface of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces.

8. In an adjustable lens mount, the combination with a mounting plate provided with two pairs of guiding surfaces formed by slots in said plate, the two guiding surfaces of one slot being parallel to each other and perpendicular to the two parallel guiding surfaces of the other slot and a lens carrying element extending through said plate, including an eccentric cam surface for engaging one of said slots on said support member and forming with the guiding surfaces of said slot one pair of cam surfaces for causing relative radial movement between said members upon relative rotation therebetween, of an intermediate element slidably mounted concentrically on the lens carrying element and having an eccentric cam surface for engaging said guiding surfaces of said other slots on said support member and forming with said guiding surface of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces, and clamping means threaded to said lens carrying element for clamping the adjustable cam surfaces in any desired position.

9. In an adjustable lens mount, the combination with a support member, provided with two cam surfaces which have their principal axis perpendicular to each other, and a lens carrying member including an eccentric cam surface for engaging one of said cam surfaces on said support member and forming with that cam surface one pair of cam surfaces for causing relative radial movement between said members upon relative rotation therebetween, of an intermediate element having an eccentric cam surface for engaging the other eccentric cam surface on said support member and forming with said other eccentric cam surface another pair of cam surfaces for causing relative radial movement between said support member and said intermediate element upon relative rotation therebetween, said pairs of cam surfaces being so located and arranged that the radial movement caused by the relative rotation of one of said pairs of cam surfaces, is limited to movement along one of said principal axes by the other pair of cam surfaces, and locking nuts positioned in front of and behind the lens in the lens carrying element for adjustably positioning the lens longitudinally with respect to the lens carrying element.

10. In a photographic apparatus having two optical systems, the combination with one optical system for transmitting the picture to the sensitive surface of an optical system for viewing the picture to be taken, said optical system displaced to one side of the said first optical system and cooperating therewith for correctly adjusting the focus of said first optical system, and means for correctly positioning the objective lens of the picture viewing optical system with respect to the other optical system, including, a mounting plate surrounding and connecting the objective lens of both optical systems, said mounting plate provided with two pairs of guiding surfaces formed by two slots in said plate, the two guiding surfaces of one slot being parallel to each other and perpendicular to the two parallel guiding surfaces of the other slot, and a lens carrying element including an eccentric cam surface for engaging one of said slots on said support member and forming with the guiding surfaces of said slot one pair of cam surfaces for causing relative radial movement between said members upon relative rotation therebetween, of an intermediate element having an eccentric cam surface for engaging said guiding surfaces of said other slot on said support member and forming with said guiding surfaces of the other slot another pair of cam surfaces for causing relative radial movement between said support member and said intermediate member upon relative rotation therebetween, said pairs of cam surfaces being so located and loosely fitted that the radial movement caused by the relative rotation of one of said pairs of cam surfaces is limited to movement in a direction parallel to one of said slots by the relative sliding action between the other pair of cam surfaces.

CHESTER W. CRUMRINE.